United States Patent [19]

Bartoov et al.

[11] 4,176,953
[45] Dec. 4, 1979

[54] METHOD AND APPARATUS FOR MEASURING THE MOTILITY OF SPERM CELLS

[75] Inventors: Benjamin Bartoov, Moshav Chemed; Abraham Mayevsky, Bnei Brak; Shmuel Mendel, Givataim; Amiram Oren, Ramat Aviv, all of Israel

[73] Assignee: SEM Israel Limited, Ramat Gan, Israel

[21] Appl. No.: 908,531

[22] Filed: May 22, 1978

[51] Int. Cl.$^2$ .................. G01N 21/26; G01N 21/00
[52] U.S. Cl. .................................. 356/73; 250/564; 356/436; 356/442
[58] Field of Search ............... 356/73, 436, 441, 442; 250/564, 573; 128/2 A

[56] References Cited
PUBLICATIONS

"Objective Measurement of Sperm Motility;" *Poultry Science*; Wall et al.; vol. 52; pp. 657–660 (1973).
"Electronic Analyzer for Measuring Velocities & the Concentration of Spermatozoa;" Rev of Scit. Inst; vol. 35 #1, pp. 52-57; Jan. 1964; Rikmenspoel.

*Primary Examiner*—Vincent P. McGraw
*Attorney, Agent, or Firm*—Benjamin J. Barish

[57] ABSTRACT

A method and apparatus for measuring sperm motility are described in which a suspension of the sperm cells is placed in a transparent container, and a predetermined field of the specimen is continuously examined by photoelectric means for detecting variations in optical density caused by the collective wave-like motion of batches of the sperm cells through the examined field. An amplitude-modulated analog electrical signal is generated by the photoelectric means in response to the variations in optical density, and the peaks and valleys of this signal are counted over a predetermined time period to provide an index of sperm motility. This technique may be, and preferably is, performed on undiluted sperm suspensions as taken from the sperm-producing organism. In addition, it may be performed quickly, is non-destructive, and provides an objective index of motility which has been found to closely correlate with actual results.

16 Claims, 5 Drawing Figures

METHOD AND APPARATUS FOR MEASURING THE MOTILITY OF SPERM CELLS

RELATED APPLICATIONS

The present application is related to U.S. patent application No. 908,276 titled "Analog Signal Analyzer," filed simultaneously with and assigned to the same assignee as the present application.

BACKGROUND OF THE INVENTION

The present invention relates to a method and apparatus for measuring sperm motility, i.e., the spontaneous movement of sperm cells.

Sperm motility is considered to be one of the most important criteria influencing the fertility of sperm cells and is commercially important in determining suitability of a specimen for the artificial insemination of animals, for example. A large number of techniques have been devised or proposed for measuring sperm motility, as described for example in the following publications: L. Nelson, "Spermatozoan Motility," *Endocrinology Male Reproductive System*, Section 7, Volume 5, 1975; D. F. Katz and H. M. Dott, "Methods Of Measuring Swimming Speed Of Spermatozoa," *J. Reprod.Fert.* 45,263–272 (1975); K. A. Wall and M. A. Boone, "Objective Measurement Of Sperm Motility," *Poultry Science* 52:657–660 (1973); and R. Rikmenspoel, "Electronic Analyzer For Measuring Velocities & The Concentration Of Spermatozoa," *The Review Of Scientific Instruments*, Volume 35, No. 1, January 1964. The known techniques, however, are generally considered not entirely satisfactory for a number of reasons, mainly because they usually require dilution of the specimen being tested, and often produce inadequate, inaccurate, and/or conflicting results.

Thus, one known approach is based on the continuous examination of the movement of individual sperm cells, this being done usually by visual or photographic observation. One of the most serious drawbacks of this approach is that it requires dilution of the specimen to enable distinguishing individual sperm cells, and then extrapolation to "in vivo" condition. The results obtained are therefore not always accurate since the precise mechanism of the dilution effect is not always known. In addition, photographic procedures introduce a substantial delay between the time the measurements are taken and the time the results are available, during which time further changes may have already occurred in the specimen.

Another known approach for measuring sperm motility is based on examining the specimen at several discrete time intervals, e.g., by multiple photographic exposures, to determine the gross property of the entire suspension at these discrete intervals, this information then being translated, by probability statistical considerations, to an indication of sperm motility by determining the fluctuations in the gross property at these discrete intervals. This approach, however, also usually requires dilution of the suspension to enable discerning individual sperm cells. In addition, it also introduces a substantial delay before the results are available. Further, the processing of the information usually requires complicated and expensive equipment, such as a computer.

BRIEF SUMMARY OF THE INVENTION

An object of the present invention is to provide a new method and apparatus for measuring sperm motility, which method and apparatus have advantages, particularly in the above-discussed respects, over the above-mentioned known approaches.

According to a broad aspect of the present invention, a suspension of the sperm cells whose motility is to be measured is placed in a transparent container, and a predetermined field of the suspension is continuously examined to detect the variations in optical density by the collective wave-like motion of batches of the sperm cells through this field. An amplitude-modulated analog electrical signal is generated in response to these variations in optical density, and the peaks and valleys of the amplitude-modulated electrical signal are counted over a predetermined period of time to provide an index of sperm motility.

The novel technique of the present invention differs from the first of the above-mentioned known approaches in that it does not detect individual cell movements, but rather detects the collective wave-like movements of batches of cells which have been found to provide a fairly accurate indication of sperm motility. The novel technique also differs from the second of the above-mentioned known approaches in that it involves a continuous examination of the suspension over the predetermined time interval, as distinguished from time exposures at discrete time intervals.

An important advantage in the novel method and apparatus over the previously-known approaches is that it permits examination of the suspension of the sperm cells in undiluted form as taken from the sperm producing organism. The suspension may therefore be examined under "in vivo" conditions, thereby obviating the possibility of error in extrapolating from the "in vitro" conditions characterisitc of the previously known techniques wherein the specimen has to be diluted. Thus, not only are the results more accurate and reliable, but they are also available substantially immediately. Further, the examination is a non-destructive one, and therefore the suspension tested may be used after the examination, thereby enabling 100% testing of all suspensions before use, e.g., for artificial insemination of animals. Moreover, the exmination may be continued for as long of an examination time as desired, the longer the examination time, the more reliable the results. Further, the procedure of the present invention permits the suspension under examination to be subjected to external influences, such as by the addition of drugs, to determine their effects on sperm motility and thereby on fertility. Still further, this procedure is performable by relatively simple and inexpensive equipment. Finally, the motility index resulting from this procedure has been found to correlate quite accurately with actual results produced by the cells examined.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
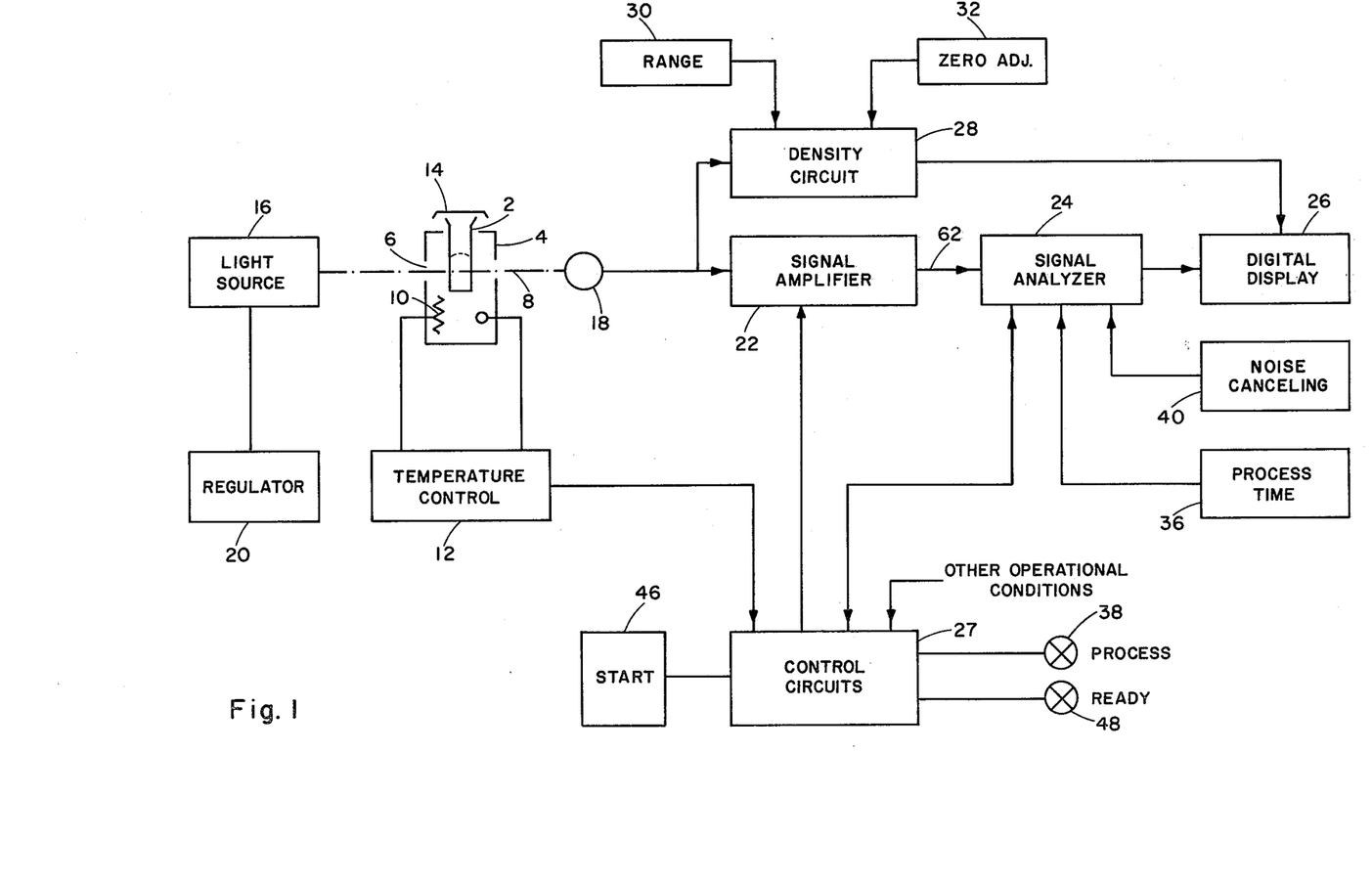
FIG. 1 is a block diagram illustrating one preferred embodiment of apparatus constructed in accordance with the invention.

The apparatus illustrated in FIG. 1 of the drawings comprises a transparent container 2 for receiving a suspension of the sperm cells whose motility is to be measured. Transparent container 2 is received within a holder 4 formed with an optical window 6 at one side of the container and with a second optical window 8 at the opposite side of the container in alignment with window 6. Holder 4 further includes an electrical heater 10 for heating container 2 and the test suspension within it to a predetermined temperature and for maintaining that temperature during the test, as controlled by a temperature control circuit 12. The controlled temperature should be approximately that of the natural environment of the sperm cells under test, for example about 39° C. for bull sperms. During the test, the transparent container 4 is closed by a cover 14.

The optical density of the suspension within transparent, container 2 is detected by a light source 16 disposed forwardly of window 6 of holder 4, and a photoelectric cell 18 disposed rearwardly of window 8 of the holder. Light source 16 may be a light-emitting diode (LED) controlled by a regulator 20. The photoelectric cell 18 generates or modulates an electrical voltage in response to the intensity of light intercepted by the cell to produce an amplitude-modulated electrical signal.

As distinguished from most of the prior known techniques for measuring sperm motility, photoelectric cell 18 does not sense individual sperm cells, but rather examines a predetermined field of the cell suspension to detect the variations in optical density caused by the collective wave-like motion of batches of the sperm cells through the field. For this purpose, window 8 of the holder 4 has a cross-sectional area at least one order of magnitude larger in each dimension than the size of the sperm cells in the suspension being tested in container 2; in addition, container 2 has a width, determining the depth of the examined field, which also is at least one order of magnitude larger than the size of the sperm cells in the suspension. For example, bull sperm cells have a head of about 5 microns in diameter, and a total length, including the tail, of about 40 microns. When the equipment is used for measuring the motility of bull sperm cells, window 8 preferably is at least 400 microns in length along each axis (e.g., a circular window of 400 microns diameter), and the breadth of transparent container 2 is preferably at least 100 microns, e.g., 1000–5000 microns, such that the cross-sectional area and depth of the field examined by photoelectric cell 18 is at least 80 times larger in each dimension than the head of the bull sperm cells, and at least 10 times larger in each dimension than the length of the sperm cells. These dimensions of the examined field are to be distinguished from the known techniques sensing individual cell movements, wherein the size of the field, in all three dimensions, was usually much closer to the actual dimensions of the cells being examined.

The photoelectric cell 18 thus outputs an amplitude-modulated analog electrical signal in response to the variations in optical density in the field examined by it, which variations in optical density are caused by the collective wave-like motion of batches of the sperm cells through the examined field. The peaks and valleys of the generated amplitude-modulated analog signal are counted over a predetermined period of time to provide an index of sperm motility. It has been found that such a technique, based on generating an analog electrical signal in response to the wave-like motions of batches of the sperm cells through the examined field, provides, among other advantages as will be discussed more fully below, a fairly accurate index of sperm motility.

The amplitude-modulated analog signal outputted by the photoelectric cell 18 is amplified in amplifier 22 and is then fed to a singal analyzer 24. Signal analyzer 24, which is described more particularly below with respect to FIG. 3, analyzes the analog signal and counts its peaks and valleys over a predetermined period of time to provide an index of sperm motility which is displayed in digital display unit 26.

The control circuits, generally designated 27, controls the temperature control unit 12, the signal amplifier 22, and the signal analyzer 24, as well as the usual other operational conditions all as schematically indicated in FIG. 1.

Digital display unit 26 may also be used for displaying the density of the suspension being tested, this density being measured by a density measuring circuit 28 receiving the electrical signal from the photoelectric cell 18. Density measuring circuit 28 may be of known construction, including a range adjustment input 30 and a zero adjustment input 32. For purposes of example, the control panel illustrated in FIG. 2 includes a range selector 30 in the form of a two-position lever, one position selecting the range "0.1," and the other position selecting the range "1.0." The control panel illustrated in FIG. 2 also includes a zero adjustment unit 32 in the form of a knob which may be rotated to provide zero adjustment of the density circuit 28.

Figure 2:
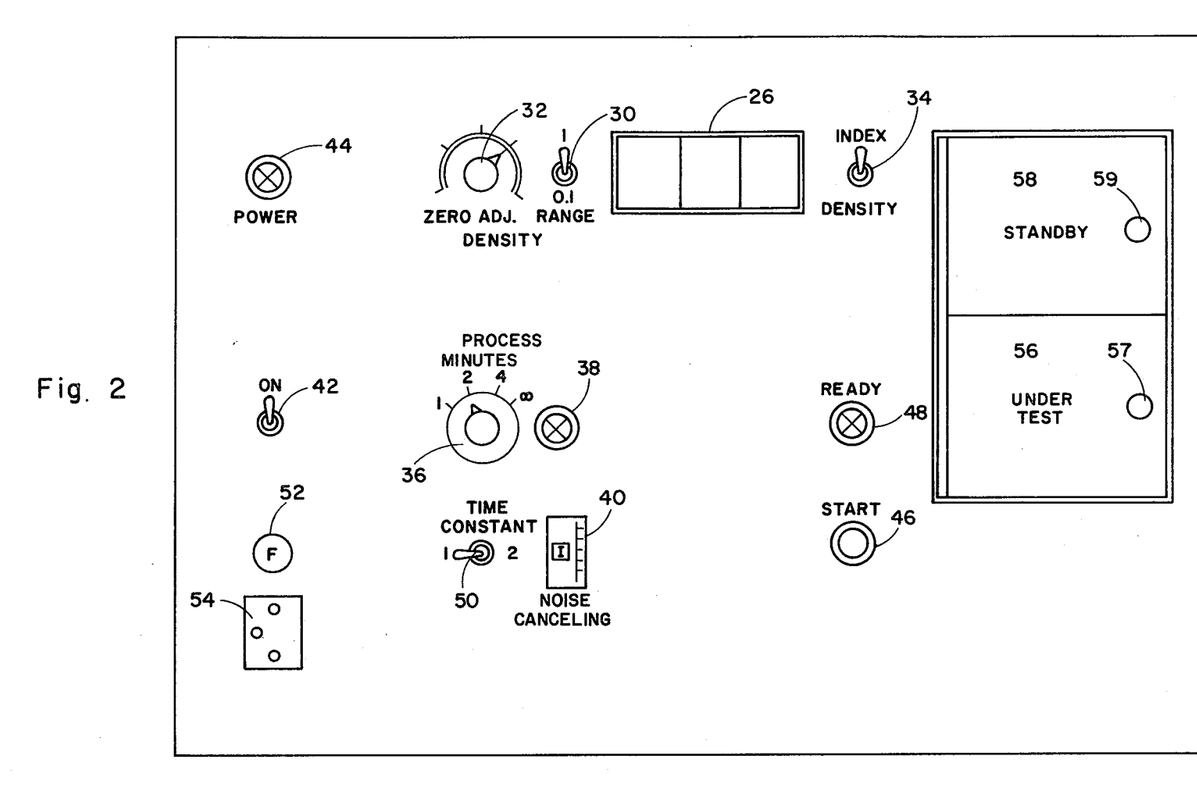
FIG. 2 is a diagram illustrating the control panel of the apparatus of FIG. 1.

Digital display unit 26 illustrated in the control panel of FIG. 2 provides a three-digit display. This unit may be selectively controlled by a selector lever 34 which, in one position, causes the motility index from analyzer 24 to be displayed, and in the other position, causes the density from the density measuring circuit 28 to be displayed.

The control panel illustrated in FIG. 2 further includes a process time selector 36 in the form of a knob which may be preset to select one of a plurality of process times, namely: 1 minute, 2 minutes, 4 minutes, or infinite ($\infty$). When a finite process time is selected (1, 2 or 4 minutes), the measuring system operates only for the specified time and provides the index of sperm motility at the end of the specified time. If selector knob 36 is set for infinity ($\infty$), the measuring circuit operates continuously and provides the index of sperm motility at predetermined periodic intervals, e.g. every two minutes. An indicator lamp 38 is provided adjacent to process time selector knob 36 to indicate when an examination is in process.

It will thus be seen that the process time for the examination of the sperm cells under test may be continued for as long as desired, as preselected by selector 36. Tests have shown that more reliable results are obtained for longer examination times.

The control panel illustrated in FIG. 2 further includes a selector 40, in the form of a thumble switch, which may be used for presetting a threshold-rate factor which determines the threshold-rate of signal change to be recognized by the measuring circuit, particularly the analyzer 24. Thus, the user can preset a desired threshold-rate of signal change in order to discriminate between gradual changes attributable to sperm movements which are to be recognized and counted, and rapid changes attributable to noise which are to be ignored. The specific manner in which the threshold-rate factor introduced by selector 40 influences the measurement is described more particularly below with respect to the description of the analyzer circuit 24 illustrated in FIG. 3.

The control panel illustrated in FIG. 2 further includes an On-switch 42 for supplying power to the apparatus, a power indicator 44 for indicating when power is being supplied, a Start-button 46 for initiating a measuring operation with respect to the suspension within the container 2, and a Ready-indicator 48 for indicating when all the necessary conditions have been fulfilled (e.g., the container is at the specified temperature, 39° C., and the head cover 14 is closed) before a measuring operation is to be initiated by depressing the start button 46.

The control panel illustrated in FIG. 2 further includes a two-position lever 50 which selects one of two time constants for the signal amplifier 22 in order to fix, as known in such amplifiers, the frequency of the band-pass of the amplifier in order to remove transient noise signals. Further illustrated in the control panel of FIG. 2 are a fuse 52 and an AC inlet socket 54.

The apparatus further includes a chamber closed by a cover 56 (FIG. 2) having a hand-knob 57 for the specimen under test, and a second chamber closed by a cover 58 having a hand-knob 59 for pre-heating a stand-by specimen to be next tested.

As mentioned above, signal analyzer 24 (FIG. 1) receives the amplified amplitude-modulated analog electrical signal outputted by the photoelectric cell 18 in response to variations in optical density caused by the collective wave-like motion of batches of sperm cells through the examined field in the transparent container 2. Analyzer 24 analyzes this analog signal and counts the significant peaks and valleys (ignoring those caused by noise) over a predetermined period of time to provide the index of sperm motility displayed in the display unit 26. The analyzer counts the number of significant peaks and valleys in the analog signal by detecting and counting the significant changes in signal-amplitude direction i.e., in the increasing or decreasing direction of change in signal-amplitude.

Figure 3:
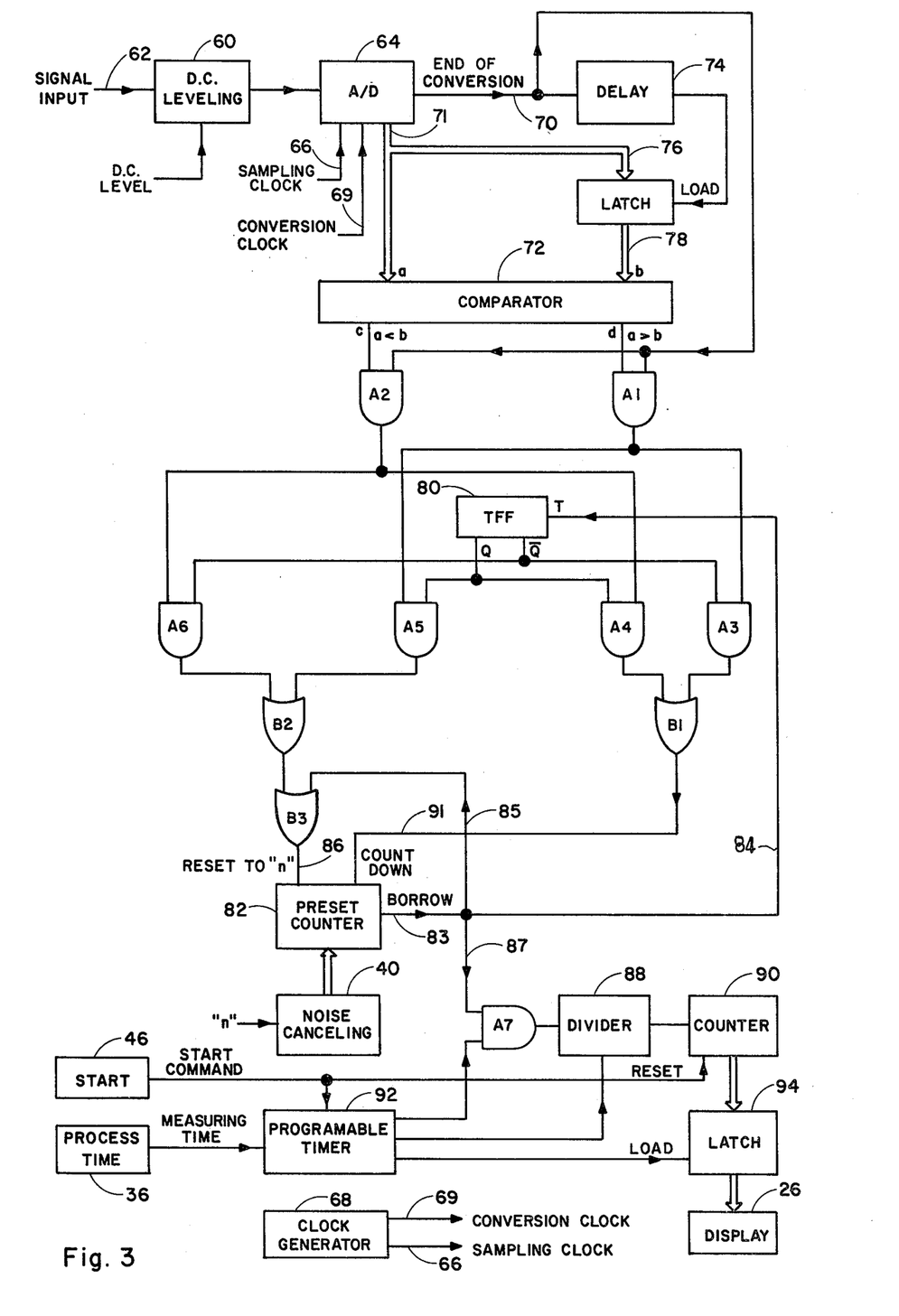
FIG. 3 is a logic circuit diagram of the signal analyzer in the apparatus of FIG. 1.

FIG. 3 illustrates the construction and operation of signal analyzer 24 of FIG. 1 for performing the above functions. It includes a DC levelling circuit 60 which receives, via input line 62, the analog signal outputted by the photoelectric cell 18 (FIG. 1) after amplification in amplifier 22 (FIG. 1). The signal is then inputted into an analog-to-digital (A/D) converter 64 which converts the analog signal to digital values at periodic sampling times as determined by sampling clocks 66 supplied by a clock generator 68, the latter also supplying the conversion clocks 69 for operating the A/D converter. The sampling clocks initiate each sampling operation, at the end of which, the A/D converter outputs an End-of-Conversion signal on its line 70. The digital value is outputted from the converter via a bus 71 to input terminal "a" of a comparator 72. The same output from bus 71 is also fed to a latch 76 loaded by a delay circuit 74, which in turn is controlled by the End-of-Conversion signal outputted from the converter 64 via line 70. The arrangement is such that the digital value outputted from converter 64 on bus 71 and applied to terminal "a" of comparator 72 is delayed by delay 74 and latch 76 before being applied via bus 78 to terminal "b" of the comparator.

Comparator 72 detects whether the signal amplitude has increased or decreased in respect of consecutive sampling times. For this purpose, comparator 72 compares the digital values of the signals applied to its terminals "a" (present sample) and "b" (previous sample); if $a<b$, indicating a decreasing signal, the comparator outputs a signal via its terminal "c;" whereas if $a>b$, indicating an increasing signal, it outputs a signal from its terminal "d."

Output terminals "c" and "d" of comparator 72 are connected to a logic circuit including a plurality of AND-gates A1–A6, a plurality of OR-gates B1–B3, and a bistable device in the form of a flip-flop 80. This logic circuit detects a reversal in direction of the signal-amplitude change at any one samping time with respect to the signal-amplitude at the previous sampling time, and is effective, upon the detection of such reversal in direction, to increment (by down-counting) a presettable counter 82 and to continue down-counting same at each subsequent sampling time in which the signal-amplitude changes continue in the same direction, until the preset number has been reached, as described more particularly below.

Presettable counter 82 is initially preset by the threshold-rate factor number ("n") via thumble switch 40. During a measuring operation, it receives pulses from OR-gate B1 to count-down until it reaches zero, this being at pulse "n." When receiving the next pulse (n+1), it outputs a pulse (the "borrow pulse") via its output terminal 83 to an output control circuit which is effective to perform a number of functions, namely: (1) via line 84, it triggers flip-flop 80; (2) via line 85, OR-gate B3, and line 86, it reloads presettable counter 82 with the threshold-rate factor; and (3) via line 87, AND-gate A7, and divider 88, it increments an output counter 90.

Flip-flop 80, when triggered by the "n+1" pulse via line 84 from the presettable counter 82, disables the logic circuit from incrementing the presettable counter 82 until the next reversal in direction of the signal-amplitude changes is detected. That is to say, assuming flip-flop 80 has been triggered by an "n+1" pulse from the presettable counter 82 by signal-amplitude changes in the signal-decreasing direction, the flip-flop will be caused to assume the state wherein it enables the logic circuit to down-count the presettable counter only upon detecting changes in the signal-increasing direction. In this state, it produces an output ($\overline{Q}=1$) to the logic circuit effective, via line 91, to down-count counter 82 with each signal-increasing output from comparator 72. When the presettable counter 82 has thus been down-counted by the number "n," the next pulse ("n+1") applied to the counter will be effective to trigger the flip-flop 90 to its opposite state wherein it produces an output (Q=1) which is effective, again via line 91, to down-count counter 82 with each signal-decreasing output from comparator 72.

It will thus be seen that gates (A3 and A4 within the logic circuit are enabled by flip-flop 80 to down-count the presettable counter 82, via line 91, at each of the sampling times in which the signal-amplitude changes continue in the same direction, until the count "n+1" is reached, at which time the presettable counter is reloaded (via line 86) with the number "n," the flip-flop 80 is triggered, and a pulse is outputted to output counter 90. Any subsequent pulse thereafter in the same direction, i.e. before a direction-reversal is detected, will merely continue to reload counter 82 via line 86. On the other hand, gates A5 and A6 are enabled by flip-flop 80 to reload, via line 86, the presettable counter 82 with the number "n" at each sampling time in which the signal-amplitude change outputted by comparator 72 is not in the same direction to which flip-flop 80 has been triggered, so that such signal changes are ignored by the system.

Knob 36 on the control panel (FIG. 2), which knob selects the process time as described above, controls a programmable timer 92 which enables gate A7 and divider 88 during the selected process time to permit counter 90 to accummulate the pulses outputted by counter 82 divided by the selected process time. Accordingly, the number in counter 90 constitutes the total number of significant peaks and valleys of the analog signal recognized and counted by the analyzer of FIG. 3, divided by the process time in minutes, i.e. the count/minute. This number is loaded into a latch 94 at the end of the selected process time and is displayed by unit 26 as the index of sperm motility measured by the apparatus.

Counter 90, and thereby display 26, are both reset by depression of the Start-button 46 which starts a new measuring operation.

Figure 4:
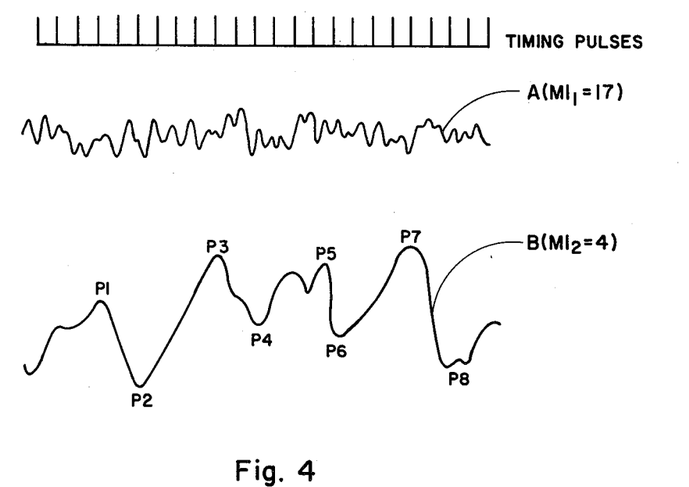
FIG. 4 illustrates two typical analog electrical signals resulting from tests performed on two test samples with the apparatus of FIG. 1, one test indicating high sperm motility, and the second test indicating low sperm motility.

FIG. 4 illustrates two analog signals generated by the examination of two specimens of bull sperm cells during an examination process time of two minutes. The upper signal A shows a count of 34 significant peaks and valleys during the two minute examination i.e., 17 peaks and valleys per minute; the motility index counted and displayed in unit 26 would therefore be "17." Such a motility index indicates high motility, so that the sperm cells examined would be suitable for artificial insemination, for example. The lower curve B shows a total count of 8 significant peaks and valleys during the two-minute examination interval (as indicated) by peaks $P_1$-$P_8$, i.e. 4 peaks and valleys per minute) which number would be displayed in unit 26. This is a low sperm motility index, e.g., such that this sperm specimen would not be suitable for artificial insemination.

The operation of the system will now be described with respect to FIG. 5, which is an enlarged fragment of the high-motility analog signal A shown in FIG. 4 during the time interval V—V of that signal. This fragment of the analog signal has been selected in order to more clearly describe the manner in which the analyzer circuit of FIG. 3 analyzes the analog signal generated by the photoelectric cell 18 to discriminate between significant peaks which are to be counted, and insignificant peaks which are to be disregarded as representing noise.

In this example, clock generator 68 in FIG. 3 supplies sampling clocks 66 at a rate of 10 per second; and buses 71 and 78 are each of 8-bits, enabling the output of 256 digital values.

Before measuring sperm motility, the user may first wish to measure optical density to provide an indication of sperm concentration. For this purpose, he would move lever 34 on the control panel (FIG. 2) to the "Density" position; place an empty transparent container 2 within the holder 4; and manipulate the zero adjustment knob 32 until all zero's appear on the display unit 26. Then, he would introduce the suspension of the sperm cells to be examined into the transparent container 2, whereupon the photoelectric cell 18 will measure the optical density of the suspension and display same in the display unit 26.

When the user desires to measure the motility of the sperm cells, he moves lever 34 to the "Index" position. In addition, the user manipulates the thumble switch 40 to enter the threshold-rate factor number which determines the threshold-rate of signal-amplitude change to be recognized by the instrument as attributable to sperm motility, in order to distinguish over the rapid signal changes attributable to noise. As noted above, the threshold-rate factor number entered by thumble switch 40 presets counter 82 (FIG. 3) within the analyzer 24. For purposes of the following description, it will be assumed that the thumble switch 40 is preset by the threshold-rate factor number "3."

The user also presets the process-time knob 36 to select the examination period. For purposes of example, it will be assumed that knob 36 is preset to select an examination period of two minutes.

Now, the Start button 46 is depressed, and assuming that the temperature within the holder 4 is at the specified one (e.g., 39° C.), that the head cover 14 has been closed over the container 2 of the suspension under test, and that any other specified conditions of the apparatus have been fulfilled, all as monitored by the control circuit 27 of FIG. 1, an examination of the specimen within the container 2 will be initiated and will continue for a period of two minutes as specified by process time selector knob 36. During this two minute interval, the photoelectric cell 18 (FIG. 1) examines a predetermined field of the suspension and generates an amplitude-modulated analog electrical signal, such as shown at A or B in FIG. 4, corresponding to the variations in optical density caused by the collective wave-like motion of batches of the sperm cells through the examined field. FIG. 5 illustrates how the peaks of this analog signal are counted in order to provide an index of motility of the sperm cells in the examined suspension.

Figure 5:
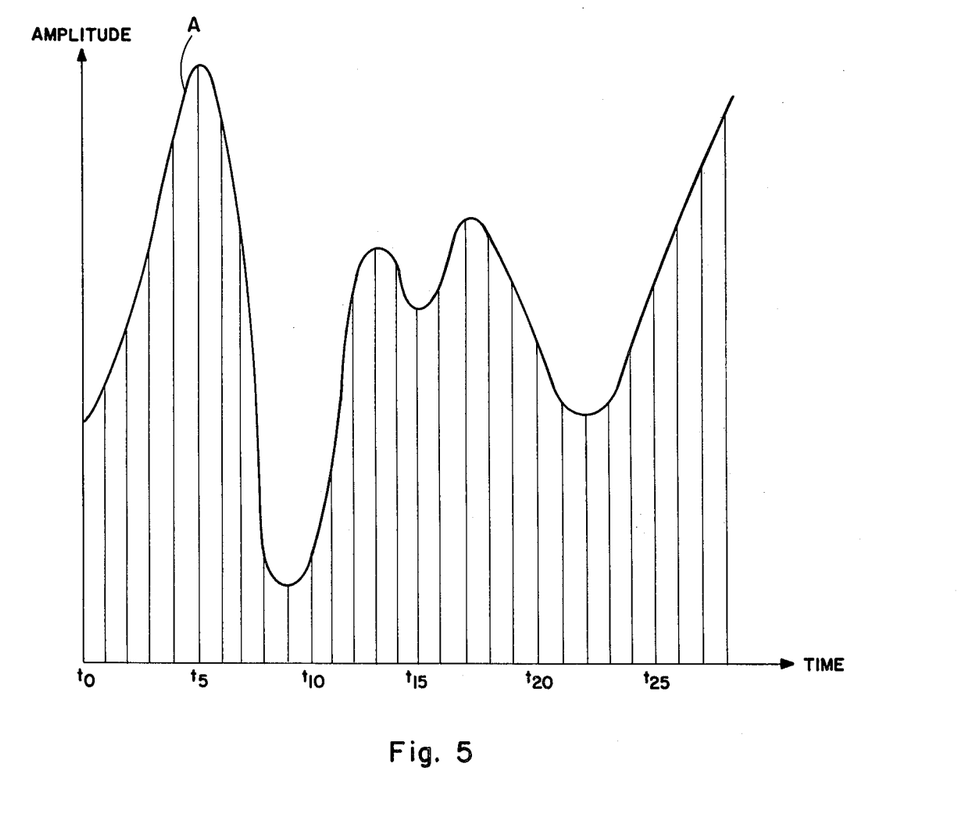
FIG. 5 is an enlarged fragment of the high-motility analog signal of FIG. 4 illustrating the operation of the signal analyzer of FIG. 3 for determining the motility index of the sperm sample tested.

Thus, with reference to FIG. 5, at clock $t_1$, the analog-to-digital converter 64 feeds to terminal "a" of comparator 72 the digital value of that signal at clock $t_1$, and also feeds, via latch 74 loaded by delay 76, to terminal "b" of comparator 72 the digital value of that signal at the previous clock $t_0$. Since the digital value of the signal at $t_1$ is larger than at $t_0$, comparator 72 outputs, via its terminal "d," a signal to gate A1 indicating that the signal is increasing. Assuming that the flip-flop 80 is then in its signal-increasing state ($\overline{Q}=1$), the signal applied to gate A1 will be fed via gates A3 and B1 to terminate 91 to down-count counter 82 one increment.

At clock $t_2$, the signal is still increasing as shown in FIG. 5, and therefore comparator 72 produces another output via its terminal "d" to gate A1 which again down-counts counter 82 a second increment. At clock $t_3$, since the signal is still increasing, counter 82 is down-counted a third count, which brings its contents to "00" since the threshold-rate factor number preset into the counter by thumble switch 40 was "3."

At clock $t_4$, since the signal is still increasing, counter 82 is down-counted a further increment, which causes it to produce an output ("borrow") pulse on its line 83. This pulse is fed via line 84 to trigger flip-flop 80 to its decreasing-signal state, i.e. Q=1. In addition, the pulse on line 83 is fed via line 85 and gate B3 to input terminal 86 of counter 82 to reload the counter with its original threshold-rate factor number ("3"). Further, the pulse on line 83 is fed via line 87, gate A7, and divider 88 (both being enabled by timer 92) to counter 90, wherein it is accummulated for subsequent display. The contents of counter 90 are displayed in unit 26 only at the end of the process time (e.g. 2 minutes) as specified by selector knob 36 this knob controlling timer 92 which loads latch 94 for the display unit 26 at the end of the selected process time.

At clock $t_5$, comparator 72 produces another output on its terminal "d" indicating that the signal is still increasing, but this signal will not be applied to the count-down terminal 91 of counter 82 since flip-flop 80 is now in its signal-decreasing state (Q=1), thereby disabling gate A3 and enabling gate A5. Accordingly, the signal from terminal "d" of comparator 72 is applied via gates A1, A5, B2 and B3 to terminal 86 of counter 82, to reload the counter with its original threshold-rate factor number "3."

At clock $t_6$, the signal is now of lower amplitude than it was at clock $t_5$, thereby comparator 72 now produces an output pulse from its terminal "c" to gate A2. Since flip-flop 80 is in its signal-decreasing state (Q=1), gate A4 is enabled, whereby the signal from A2 is fed via gates A2, A4 and B1 to the count-down terminal 91 of counter 82. Accordingly, counter 82 will be down-counted one number, so that its contents are now "2."

At clock $t_7$, the signal is still decreasing, so that comparator 72 produces another output from its terminal "C" via gates A2, A4 and B1 to down-count counter 82 a second increment, so that its contents are now "1." The counter is down-counted a third increment by the decreasing signal at clock $t_8$ (at which time its contents would be "zero"), and a fourth increment at clock $t_9$, at which time its contents pass "zero," producing a "borrow" pulse on output line 83. This pulse is applied, as described above: via line 84 to trigger flip-flop to its signal-increasing state ($\overline{Q}$=1); via line 85, to reload counter 82 with its original threshold-rate factor number ("3"); and via line 87 and divider 88 to counter 90.

During clocks $t_{10}$–$t_{13}$, comparator 72 outputs four pulses via its signal-increasing terminal "d," and since flip-flop 80 is now in its increasing-signal state ($\overline{Q}$=1) counter 82 will be down-counted four increments to produce an output on its line 83 which trips the flip-flop to its signal-decreasing state, reloads counter 82 with its original threshold-rate factor number ("3"), and registers another one-half count (i.e. one count divided by "2" in divider 88) within counter 90.

At clocks $t_{14}$ and $t_{15}$, comparator 72 outputs pulses via its signal-decreasing terminal "c" which pulses will down-count counter 82 two increments since flip-flop 80 is now in its signal-decreasing state. However, at clock $t_{16}$ comparator 72 produces an output pulse from its signal-increasing terminal "d." This pulse passes through gate A5, since flip-flop 80 is in its signal-decreasing state, to terminate 86 of preset counter 82, reloading the counter with its original threshold-rate factor number "3." Accordingly, the rapid signal change between time clocks $t_{15}$ and $t_{16}$ will be disregarded by the analyzer as merely noises and will not reach divider 88 or counter 90.

The same result is produced at clock $t_{17}$ since flip-flop 80 is still in its signal-decreasing state.

At clock $t_{18}$, comparator 72 detecting that the signal is now decreasing, produces an output pulse from its terminal "c" which is applied, via gates A2, A4 (enabled by the signal-decreasing state of flip-flop 80), and B1 to the count-down terminal 91 of counter 82, thereby decrementing the counter one increment. The same occurs at clocks $t_{19}$, $t_{20}$ and $t_{21}$, at which time an output pulse is produced via line 83 from counter 82 to trigger flip-flop 80 to its signal-increasing state, to reload counter 82 with its original threshold-rate factor number "3," and to increment divider 88 and counter 90.

The analyzer continues in the foregoing manner to analyze the analog signal, detecting the significant peaks and valleys exceeding the preselected threshold-rate factor ("3"), and ignoring the insignificant peaks attributable to noise. The process is continued for the process time specified by selector knob 36 (in this case two minutes), at which time, timer 92 loads latch 94 with the contents of counter 90 for display in unit 26, the displayed number representing the motility index.

In the example illustrated by curve A of FIGS. 4 and 5, 34 peaks and valleys would be counted during the two-minute process time interval, whereupon the motility index displayed would be 17. As mentioned above, this represents a high motility index, indicating that the specimen examined has a high degree of fertility and would therefore be suitable for, e.g., artificial insemination.

Since the above-described technique detects the variations in optical density by the collective wave-like motion of batches of the sperm cells through the examined field, as distinguished from the mentioned previously-known techniques which sense individual cell movements, the technique of the present invention may be used, and is preferably used, with respect to undiluted specimens of the sperm cells. Thus, the technique of the present invention has been found to provide a good objective evaluation of specimen having concentrations of up to and over $2500 \times 10^6$ cells per milliliter. This is to be distinguished from the previously known techniques which required the specimen to be diluted to no more than about $300 \times 10^6$ cells per milliliter to enable sensing the individual cell movements. By thus enabling the specimen to be examined in undiluted form, as taken from the sperm-producing organism the invention permits examination under "in vivo" conditions, thereby obviating the need to extrapolate from the "in vitro" conditions of the previously known techniques requiring dilution. Further, the above-described examination is a non-destructive and non-invasive one, and therefore the suspension tested may be used, e.g. for artificial insemination, after the examination; this enables 100% testing of the specimens before being used. Further, the novel technique permits the specimen under examination to be subjected to external influences, such as by the addition of drugs, to determine their affects on sperm motility. Still further, the examination time, and also the threshold-rate factor of signal change to be detected, may be preselected for each particular case to provide the accuracy of results requird for the particular case. Still further, the examination process may be performed very quickly and requires the use of equipment which is relatively simple to produce and to operate. But perhaps most important, the motility index produced by this examination has been found to correlate quite accurately with actual fertility results.

While the described signal analyzer is particularly useful for analyzing the amplitude-modulated analog electrical signal generated in the course of this method, it may also be used for analyzing other types of analog electrical signals, and is therefore covered by a separate patent application filed simultaneously with the present one and assigned to the same assignee as the present one.

The invention has been described with respect to one preferred embodiment, but it will be appreciated that many variations, modifications and other applications of the invention may be made.

What is claimed is:

1. A method of measuring the motility of sperm cells, comprising: introducing a suspension of the sperm cells in a transparent container; continuously examining a predetermined field of said suspension to detect the variations in optical density caused by the collective wave-like motion of batches of the sperm cells through said field; generating an amplitude-modulated analog electrical signal in response to said variations in optical density; and counting the peaks and valleys of said amplitude-modulated analog signal over a predetermined period of time to provide an index of sperm motility.

2. The method according to claim 1, wherein said examined predetermined field is of a cross-sectional area and depth at least one order of magnitude larger in each dimension than the size of the sperm cells in the suspension.

3. The method according to claim 1, wherein said suspension of sperm cells is an undiluted one as taken from the sperm-producing organism.

4. The method according to claim 1, wherein the peaks and valleys of said amplitude-modulated analog signal are counted by detecting and counting the changes in amplitude direction of the analog signal occurring at predetermined sampling times.

5. The method according to claim 1, wherein said suspension within the container is maintained at a temperature approximately that of the natural environment of the sperm cells.

6. Apparatus for measuring the motility of sperm cells, comprising: a transparent container for receiving a suspension of the sperm cells whose motility is to be measured; optical-density detecting means continuously examining a predetermined field of the specimen to detect the variations of optical density caused by the collective wave-like motion of batches of the sperm cells through said field, and generating an amplitude-modulated analog electrical signal in response to said variations in optical density; and counting means for counting the peaks and valleys of said amplitude-modulated analog signal over a predetermined period of time to provide an index of sperm motility.

7. Apparatus according to claim 6, further including display means for displaying said index of sperm motility.

8. Apparatus according to claim 6, wherein said optical-density detecting means comprises a light source for projecting light through said transparent container from one side thereof, and photoelectric means at the opposite side of the transparent container for generating said amplitude-modulated analog electrical signal in response to the variations in optical density caused by said collective wave-like motion of batches of the sperm cells.

9. Apparatus according to claim 8, wherein said transparent container and said photoelectric means define an examined predetermined field having a cross-sectional area and depth of at least one order of magnitude larger in each dimension than the size of the sperm cells of the suspension.

10. Apparatus according to claim 6, wherein said counting means comprises a signal analyzer analyzing said amplitude-modulated analog signal to detect and count the changes in sign of the analog signal occurring at predetermined sampling times.

11. Apparatus according to claim 10, further including presettable noise discriminating means for presetting the threshold-rate of signal-amplitude changes to be recognized and counted by the signal analyzer.

12. Apparatus according to claim 6, further including presettable process time means for presetting said predetermined period of time during which the peaks and valleys of the amplitude-modulated analog signal are counted to provide the index of sperm motility.

13. Apparatus according to claim 12, wherein said presettable process time means comprises a time selector which my be preset either to select one of a plurality of specified process times, in which case the counter operates only for the specified process time and provides said index at the end of the specified time, or to select a continuous process time, in which case the counter operates continuously and provides said index at predetermined periodic intervals.

14. Apparatus according to claim 6, further including an optical density measuring circuit for measuring the optical density of the suspension in the transparent container and for displaying said measurement.

15. Apparatus according to claim 14, further including zero adjustment means for adjusting the optical density measuring circuit to zero when the optical density of the empty container is measured, to thereby provide a reference for the measurement of the optical density of the suspension.

16. Apparatus according to claim 6, further including a holder for receiving the container for the suspension, an electrical heater for heating said container, and temperature control means for maintaining the temperature of the container constant during the measurement.

* * * * *